United States Patent
Yamada et al.

(10) Patent No.: US 10,114,643 B2
(45) Date of Patent: Oct. 30, 2018

(54) TECHNIQUES FOR DETECTING RETURN-ORIENTED PROGRAMMING

(71) Applicant: INTEL CORPORATION, Santa Clara, CA (US)

(72) Inventors: Koichi Yamada, Los Gatos, CA (US); Palanivelra Shanmugavelayutham, San Jose, CA (US); Arvind Krishnaswamy, San Jose, CA (US); Jason M. Agron, San Jose, CA (US); Jiwei Lu, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,531

(22) PCT Filed: May 23, 2013

(86) PCT No.: PCT/US2013/042369
§ 371 (c)(1),
(2) Date: Dec. 26, 2013

(87) PCT Pub. No.: WO2014/189510
PCT Pub. Date: Nov. 27, 2014

(65) Prior Publication Data
US 2015/0095628 A1    Apr. 2, 2015

(51) Int. Cl.
*G06F 9/30* (2018.01)
*G06F 21/54* (2013.01)
(Continued)

(52) U.S. Cl.
CPC ...... *G06F 9/30058* (2013.01); *G06F 12/0875* (2013.01); *G06F 21/54* (2013.01); *G06F 2212/452* (2013.01)

(58) Field of Classification Search
CPC .................................................. G06F 9/30058
See application file for complete search history.

(56) References Cited

U.S. PATENT DOCUMENTS 7,287,283 B1    10/2007  Szor
7,516,453 B1 *  4/2009  Bugnion ............. G06F 9/45504
                                              712/227
(Continued)

FOREIGN PATENT DOCUMENTS

WO    2013040598    3/2013

OTHER PUBLICATIONS

International Search Report and Written opinion received for PCT Patent Application No. PCT/US2013/042369, dated Mar. 17, 2014, 15 pages.

*Primary Examiner* — Benjamin P Geib
*Assistant Examiner* — William V Nguyen

(57) ABSTRACT

Various embodiments are generally directed to techniques to detect a return-oriented programming (ROP) attack by verifying target addresses of branch instructions during execution. An apparatus includes a processor component, and a comparison component for execution by the processor component to determine whether there is a matching valid target address for a target address of a branch instruction associated with a translated portion of a routine in a table comprising valid target addresses. Other embodiments are described and claimed.

27 Claims, 10 Drawing Sheets

(51) Int. Cl.
 *G06F 12/08* (2016.01)
 *G06F 12/0875* (2016.01)

(56) References Cited

U.S. PATENT DOCUMENTS

| | | | | |
|---|---|---|---|---|
| 2002/0194463 | A1* | 12/2002 | Henry | G06F 9/30149 |
| | | | | 712/239 |
| 2004/0168078 | A1* | 8/2004 | Brodley | G06F 21/52 |
| | | | | 713/190 |
| 2005/0257024 | A1* | 11/2005 | Ray | G06F 9/3001 |
| | | | | 712/11 |
| 2006/0020918 | A1* | 1/2006 | Mosberger | G06F 11/3409 |
| | | | | 717/124 |
| 2008/0301415 | A1* | 12/2008 | Maeda | G06F 9/455 |
| | | | | 712/225 |
| 2009/0158012 | A1 | 6/2009 | Hansen et al. | |
| 2012/0030758 | A1 | 2/2012 | Van Den Berg et al. | |
| 2012/0117301 | A1* | 5/2012 | Wingard | G06F 12/1027 |
| | | | | 711/6 |
| 2012/0167120 | A1 | 6/2012 | Hentunen | |
| 2013/0117843 | A1 | 5/2013 | Komaromy et al. | |
| 2013/0185792 | A1* | 7/2013 | Balakrishnan | G06F 21/54 |
| | | | | 726/22 |

* cited by examiner ns of a malicious routine might still be stored into pages
TECHNIQUES FOR DETECTING RETURN-ORIENTED PROGRAMMING

TECHNICAL FIELD

Embodiments described herein generally relate to detecting a return-oriented programming attack against a computing device by verifying a branch address target during execution of a routine.

BACKGROUND

The increasing use of computing devices in all manner of tasks including handling of commercially valuable or personally identifiable information, performing important financial transactions, and controlling dissemination of confidential information has made the ability to secure computing devices against attacks to steal information and/or to more generally take control of them ever more important. Over time, as attack techniques have continued to evolve, so have techniques to thwart attacks.

For a number of years, vulnerabilities in the manner in which the call stack (also known as the execution stack or control stack) maintained by the processor components of many computing devices were a focus of attacks. Such attacks entailed loading portions of a malicious routine into pages of a storage of a computing device, and then overwriting a portion of the call stack in what is commonly referred to as a "stack overflow" to cause execution of instructions to jump to the instructions of the malicious routine, thereby taking control of that computing device.

In answer to this type of attack, newer processor components were augmented with the ability to mark individual pages of a storage of a computing device as either "writable" or "executable," but not both, in a mechanism often referred to as "W-XOR-X." With such a mechanism in place, portions of a malicious routine might still be stored into pages of a storage marked as "writable," but once written into those pages, those portions could not be executed due to those pages not being marked "executable." Thus, even after successfully causing a stack overflow, it was not possible to cause a change in flow of execution to the instructions of the malicious routine.

However, attack techniques have continued to evolve since the widespread introduction of "W-XOR-X" mechanisms in processor components. More recent attacks have focused on examining legitimate routines already stored in pages marked "executable" in computing devices to find portions of those routines that can be combined through a series of jumps to perform functions to gain control of a computing device. Such attacks commonly use library routines that are a frequent component of the operating systems of many computing devices. Library routines tend to be made up of sizable sets of individually callable functions made available to help other routines perform various routine functions. The large size of many of such libraries results in their being a very large number of available functions made up of portions of executable instructions that can be maliciously used if caused to be executed in a particular order.

This type of attack is commonly referred to as return-oriented programming (ROP) due to its reliance on the frequent use of "return" instructions in such legitimate routines to cause jumps among these portions of executable instructions of these library functions by altering the target addresses that are next jumped to by the legitimate return instructions at the end of each of these functions. In effect, a ROP attack uses a computing device's own legitimate library routines against it, thereby circumventing "W-XOR-X" mechanisms by delaying or entirely avoiding the loading of malicious code.

DETAILED DESCRIPTION

Figure 1:
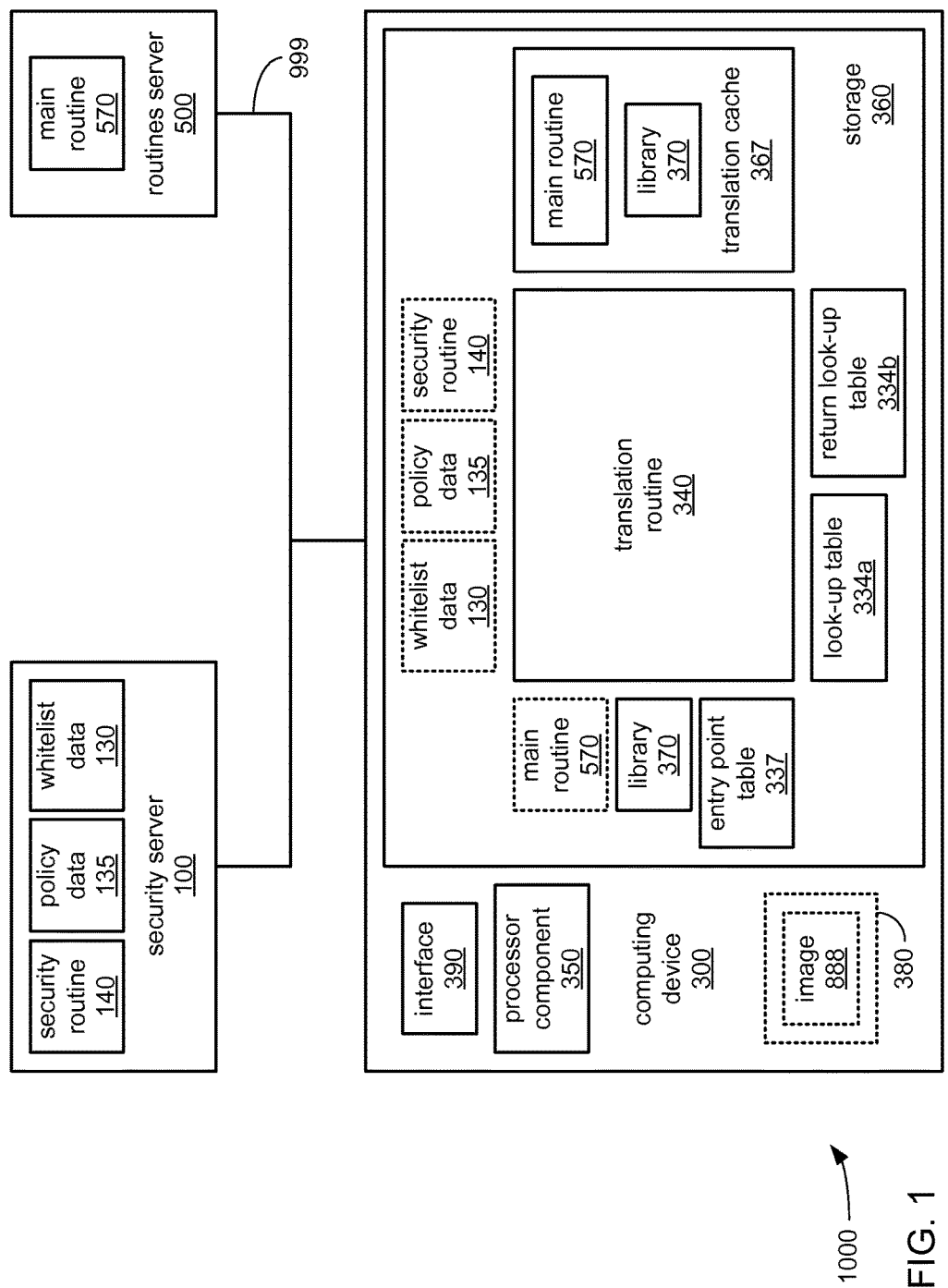
FIG. 1 illustrates an embodiment of an ROP attack detection system.

Various embodiments are generally directed to techniques to detect a return-oriented programming (ROP) attack by verifying target addresses of particular branch instructions during execution. More specifically, identifiers of targets incorporated into particular indirect branch instructions of portions of routines are used to access table(s) of valid target addresses for targets for one or more routines to obtain known valid target addresses for each during translation and/or execution. Subsequently, during execution, a comparison is made between the target address to which the branch instruction would direct the flow of execution and the known valid target address retrieved from the table(s). If there is a match, then the target address to which the branch instruction would direct the flow of execution is deemed valid and that indirect branch instruction is executed. However, if there isn't a match, then the target address to which that indirect branch instruction would direct the flow of execution is deemed invalid, and possibly an indication of a ROP attack.

As will be familiar to those skilled in the art, it is not possible at the time a routine is written or compiled to know where it will be located in the address space of a storage of a computing device during execution. Therefore, branch instructions of a routine must refer to the targets to which they jump as offsets from a starting point of the routine, as identifiers of entry points to other routines (e.g., function routines of libraries), and/or in other ways that do not entail specifying particular addresses. During translation and/or execution of the routine, the target addresses are able to be determined based on the addresses at which the routine and/or other routines are stored.

Branch instructions are generally categorized as direct or indirect branch instructions depending on the manner in which they specify their targets. Generally, direct branch instructions specify their targets with an offset or other indication of their targets directly embedded within them that enables the target addresses of their targets to be directly calculated once the address at which the routine is stored in a storage for execution is known. Direct branch instructions generally direct the flow of execution towards another portion of the same routine in which they exist. Generally, indirect branch instructions specify their targets with an identifier (e.g., a name of function routine, etc.) or by specifying that the target is the one at whatever address is stored in a register or variable at the time the branch instruction is executed. Indirect branch instructions may direct the flow of execution towards another portion of the same routine in which they exist, but are generally used to direct the flow of execution towards a different routine (e.g., a function routine of a library). Thus, the target address of a target of an indirect branch instruction cannot simply be calculated based on the address at which the routine is stored in a storage for execution. Instead, either a table matching target identifiers to target addresses must be used, or at least a portion of the routine preceding the branch instruction must be executed in order to derive the target address to determine what the target address is.

In a ROP attack, mechanisms by which the target address for indirect branch instructions are derived during execution are deliberately interfered with to alter those target addresses in order to redirect the flow of execution towards instructions of legitimate routines that were never intended to be targets for those routines. As previously discussed, instructions of function routines of libraries are frequently used in this way in a ROP attack given that such function routines commonly end with a "return" instruction intended to cause the flow of execution to return to the routines from which the flow of execution originally emanated. In a ROP attack, the target addresses of return instructions are interfered with to substitute addresses of instructions in multiple routines (e.g., function routines of one or more libraries) that are not meant to be targets to "cobble together" pieces of legitimate code from those routines to perform a malicious task. In effect, the return instruction of each of the cobbled together routines is subverted to cause a jump into a portion of another of the cobbled together routines such that it is the return instructions of each of these routines that ties them together. It is this subversion of return instructions to effect a "jumping about" among portions of legitimate routines that gives the ROP attack its name.

It should be noted that although the term return-oriented programming arises from such altering of target addresses of return instructions, the target addresses of one or more other types of indirect branch instruction may also be similarly altered in a ROP attack, including indirect "jump" instructions and "call" instructions. Thus, although instances of such altering of target addresses of indirect jump instructions is sometimes separately referred to as "jump-oriented programming" (JOP) to distinguish it from such altering of target address of return instructions, it has become commonplace to use the term "return-oriented programming" or "ROP" to refer more generally to attacks in which such altering of target addresses for a variety of types of indirect branch instruction takes place.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities. Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given. Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a ROP detection system 1000 incorporating one or both of a security server 100, a computing device 300 and a routines server 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 500 exchange signals conveying routines to be executed and/or data concerning security in executing routines through a network 999. However, one or more of these computing devices may exchange other data entirely unrelated to security in executing routines with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 incorporates one or more of a processor component 350, a storage 360, a display 380 and an interface 390 to couple the master device 300 to the network 999. The storage 360 stores one or more of a security routine 140, a whitelist data 130, a policy data 135, a translation routine 140, a look-up table 334*a*, a return look-up table 334*b*, a library 370, an entry point table 337 and a main routine 570. Further, a portion of the storage 360 is allocated as a translation cache 367 into which translated portions of the main routine 570 and/or the library 370 may be placed for execution by the processor component 350.

Each of the security routine 140, the translation routine 370, the library 370 and the main routine 570 incorporates a sequence of instructions operative on the processor component 350 in its role as a main processor component of the computing device 300 to implement logic to perform various functions. The computing device 300 may receive the security routine 140, along with one or both of the whitelist data 130 and the policy data 135, from the security server 100, possibly via the network 999. Alternatively or additionally, the computing device 300 may receive the main routine 570 from the routines server 500, also possibly via the network 999.

In executing the translation routine 340, the processor component 350 translates portions of one or both of the main routine 570 and the library 370 into translated portions of one or both that are stored in the translation cache 367 for execution. It is during translation that addresses of variables and targets of branch instructions are generally derived. Thus, for direct branch instructions, the target addresses of their targets are calculated during translation, and those target addresses are directly incorporated into those direct branch instructions as portions of routines are placed in the translation cache 367.

For at least some indirect branch instructions that incorporate an identifier of their intended targets, the translation routine 340 attempts to determine their target addresses by using those identifiers to refer to the entry point table 337 to retrieve target addresses therefrom that are known to be valid during translation from one of one or more tables of valid target addresses. This may be done in embodiments in which the library 370 is accompanied by such a table as the entry point table 337 in which valid target addresses of instructions within the library 370 at which the execution of each one of its function routines is meant to begin. As those skilled in the art will readily recognize, each sequence of instructions that implements a function routine within a library has what is commonly referred to as an "entry point" at which there is an instruction at which the execution of that function routine is meant to begin, and at which execution normally does begin. A characteristic of a ROP attack is to attempt to use only a portion of the sequence of instructions of function routine by causing execution to start somewhere in its sequence of instructions other than at its intended entry point.

The translation routine 340 may alternatively or additionally use identifiers incorporated into indirect branch instructions to retrieve indications of target addresses known to be valid from one or more alternate or additional tables such as the whitelist data 130. As those skilled in the art of will readily recognize, it is commonplace to include one or more sizable libraries with an operating system that may normally be stored at predictable addresses locations in storages across a variety of computing devices. Due to the reliance of what may be a great many other routines on the function routines of those libraries, those who create those libraries are likely to make changes to those libraries only very infrequently for fear of causing unforeseen and undesirable effects on the other routines that use them. Thus, the content of such libraries tends to change only infrequently over time such that it becomes feasible to construct a viable whitelist of valid target addresses for valid entry points of the function routines to which a branch instruction may validly jump.

Alternatively, where the library 370 and/or other libraries are not so consistently stored at predictable addresses, the valid target addresses of valid entry points indicated in such tables as the entry point table 337 and/or the whitelist 130 may be derived once the addresses of such libraries as the library 370 are known. More precisely, such tables as the entry point table 337 and/or the whitelist 130 may be generated and/or filled with indications of valid entry points and their known valid target addresses as the address locations of the library 370 and/or other libraries are determined. It should also be noted that such tables as the entry point table 337 and/or the whitelist 130 may be implemented as any of a variety of types of data structure in which indications of valid target addresses may be stored in any of a variety of formats.

Where the translation routine 340 is able to retrieve a valid target address from the entry point table 337, the whitelist 130 or another table that correlates identifiers incorporated into indirect branch instructions to valid target addresses during translation, the translation routine 340 stores that retrieved valid target address in the look-up table 334*a*. It should be noted that in attempting to determine a valid target address during translation, the translation routine 340 is, in effect, making a prediction of what the valid target address will be during execution. The making of such a prediction is based on an assumption that the target addresses indicated in such tables as the entry point table 337 and the whitelist 130 that are known to be valid during translation will still be valid during execution. This should be true where such tables are static. However, even where such tables are given to changing over time, it is presumed that the rate of such change is relatively slow such that target addresses known to be valid during translation are highly unlikely to have changed by the time execution reaches the point at which a check of validity is made. It should be noted that the look-up table 334*a* may also be implemented as any of a variety of types of data structure in which indications of valid target addresses may be stored in any of a variety of formats. Further, the look-up table may incorporate both a main data structure and a cache of that main data structure in which the most recently accessed target addresses are maintained in a manner enabling faster retrieval.

As the translation routine 340 translates portions of the main routine 570 and/or the library routine 370, the translation routine 340 replaces an indirect branch instruction in those portions with a stub instruction that causes the flow of execution by the processor component 350 to be directed back to the translation routine 340. Such a stub instruction returns control of the flow of execution to the translation routine 340 to enable the translation routine 340 to check whether the target address to which that indirect branch instruction attempts to jump matches any of the known valid target addresses stored in the look-up table 334*a*. Presuming that there has not been a stack overflow or other malicious action during execution of a translated portion of whatever routine was placed in the translation cache 367 up to that stub instruction, there should be a match for the target address of the target to which the indirect branch instruction would direct the flow of execution. Upon determining that there is a match, the translation routine 340 permits that indirect branch instruction to be executed. Different types of stub instruction are substituted for different types of indirect branch instruction. Thus, a different type of stub instruction may be associated with each of indirect jump instructions, call instructions and return instructions. In some embodiments, there may also be a type of stub instruction that is inserted at the end of a translated portion of a routine placed in the translation cache 367 to serve as a signal to the translation routine 340 that more of that routine needs to be translated and placed in the translation cache 367 to enable execution of that routine to continue.

However, if the target address derived during execution of the translated portion of whatever routine that was placed in the translation cache 367 has been somehow modified since that portion was translated and placed in the translation cache 367, then there will not be a match for the target address of the target to which that indirect branch instruction would direct the flow of execution with any of the valid target addresses in the look-up table 334a. In various embodiments, this lack of there being a match may be deemed an indication of a ROP attack, and the translation routine 340 may take one or more possible actions in response, those actions possibly specified in the policy data 135. Among those actions may be to attempt to find a match for the target address derived during execution among the valid target addresses in one or both of the entry point table 337 and the whitelist 130. This may be done in response to the possibility that one or both of these tables are dynamic in nature such that their listings of target addresses known to be valid may change over time. Also among the possible actions may simply be to terminate execution of whatever routine that branch instruction belongs to. Another possible action is to signal the security routine 140 to analyze that routine to determine whether it is deemed safe to allow it to continue to be executed in spite of the lack of a matching valid target address in the look-up table 334a such that the branch instruction is allowed to be executed by processor component 350. This latter possible action may be taken in recognition of the fact that some legitimate routines that are executed properly and are not a security threat may perform actions that do bring about an instance of deriving a target address during execution that is not a match for any of the valid target addresses.

It should be noted that in instances where an indirect branch instruction encountered during translation is a "call" instruction (e.g., a call from a portion of the main routine 570 to a library function of the library 370), the translation routine 340 may additionally derive a known valid target address for the return instruction that is expected to accompany that call instruction, and store that known valid target address for that return instruction in the return look-up table 334b. Then, when the stub instruction associated with a return instruction expected to be associated with that call instruction is executed, the translation routine 340 checks whether the target address of the target to which the return instruction seeks to direct the flow of execution matches the valid target address stored in the return look-up table. This ensures that the target address of that return instruction derived during execution has not been modified to cause the flow of execution to jump to an illegitimate target address. A hallmark of ROP attacks is to modify the target addresses of return instructions as part of causing execution to jump among pieces of legitimate code to perform a malicious function.

It should be also noted that although only the one main routine 570 and the one library 370 are depicted as translated and readied for execution, this is but a simplified example presented for the sake of enabling understanding and should not be taken as limiting the number of routines and/or libraries that may be so translated and readied for execution at any given time. Indeed, it is envisioned that the translation and readying of numerous routines and/or libraries for execution may occur substantially simultaneously at any given time in various embodiments. The routine 570 and/or the library 370 may incorporate sequences of instructions to perform any of a variety of functions. By way of example, one or both may be components of a user interface (e.g., a visual user interface 888 visually presented on the display 380), a database processing engine, applications software (e.g., word processing, illustrating, photo manipulation), etc.

In various embodiments, the processor component 350 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 360 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 390 may employ any of a wide variety of signaling technologies enabling computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
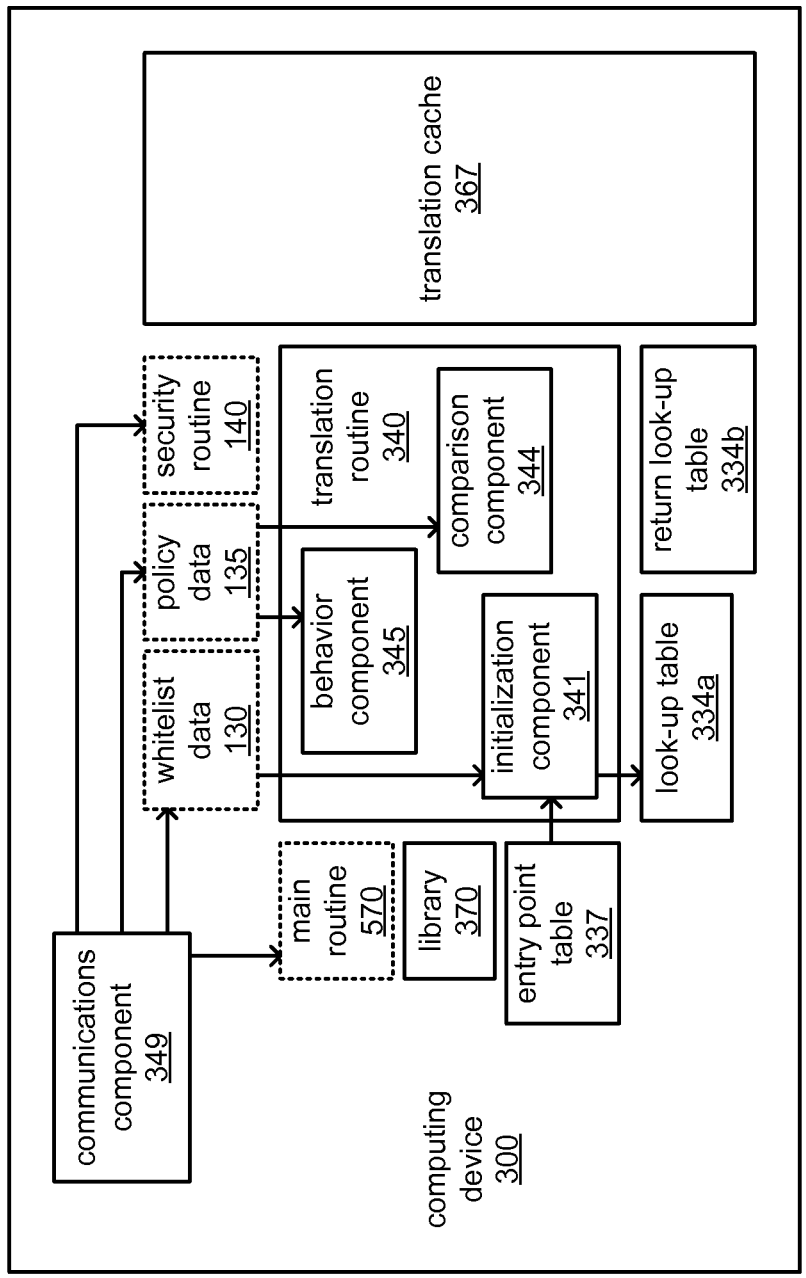
FIGS. 2-6 each illustrate a phase of operation of an embodiment.
Figure 3:
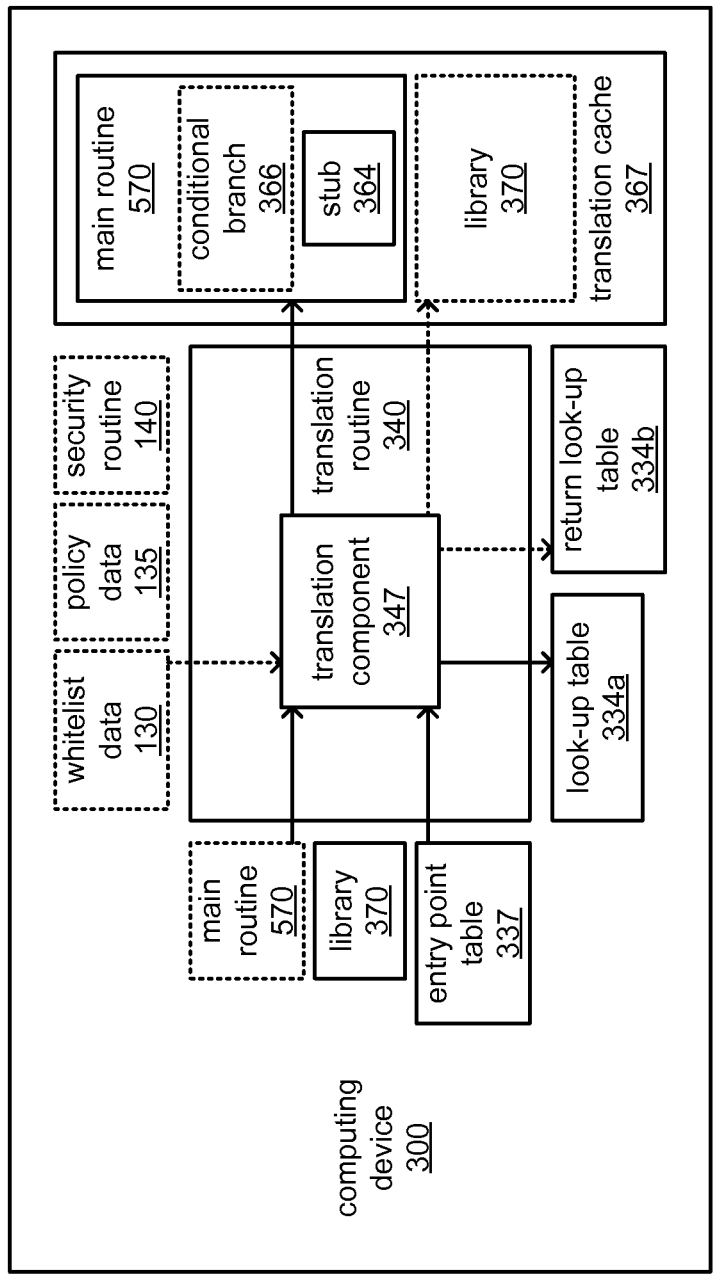
Figure 4:
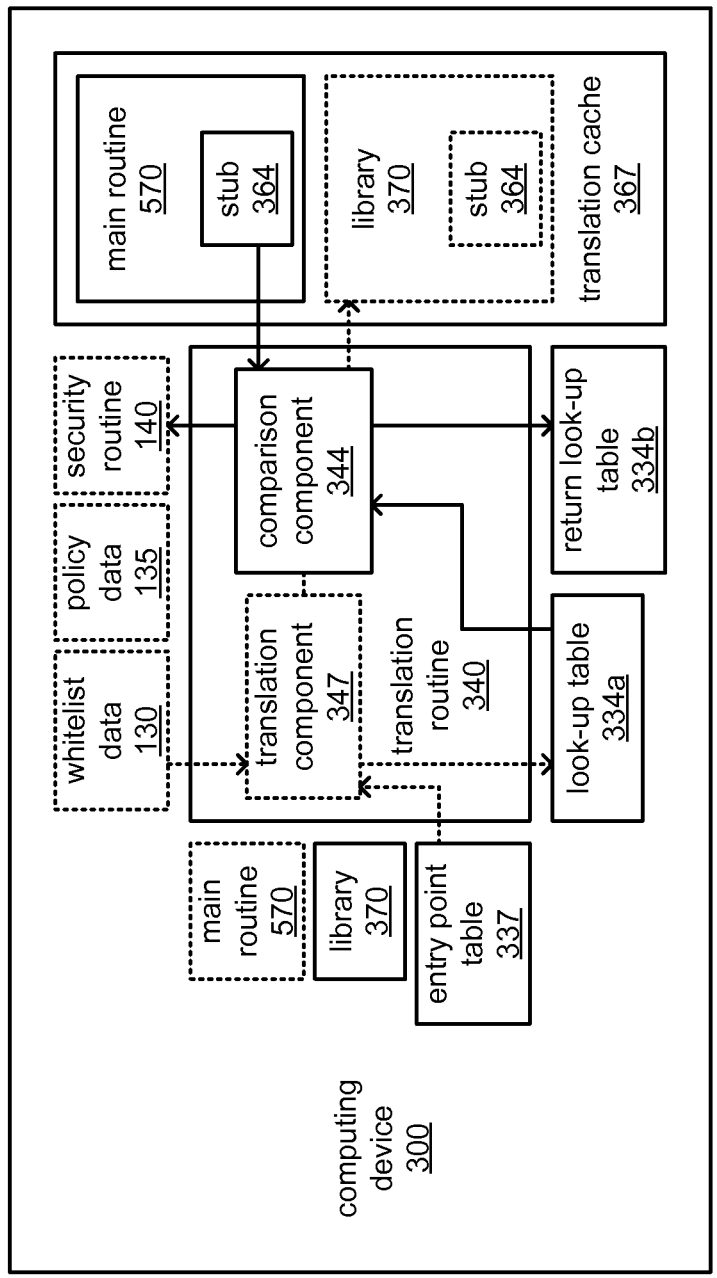
Figure 5:
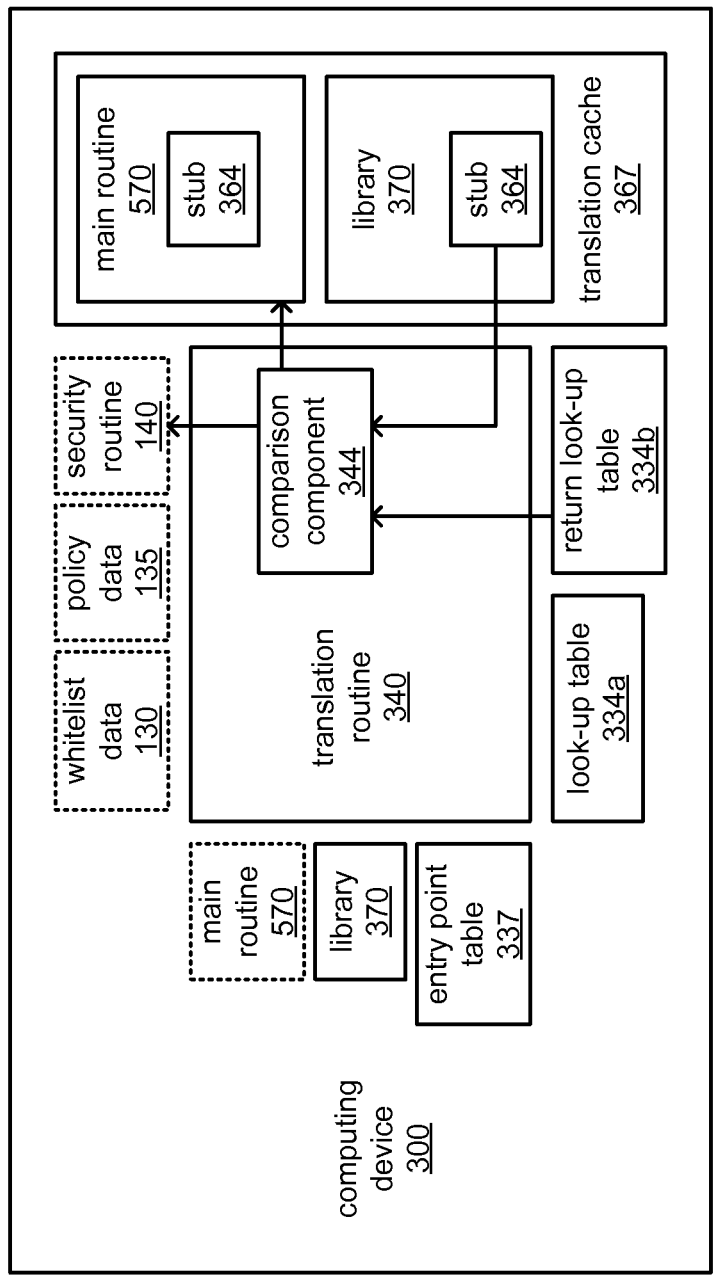
Figure 6:
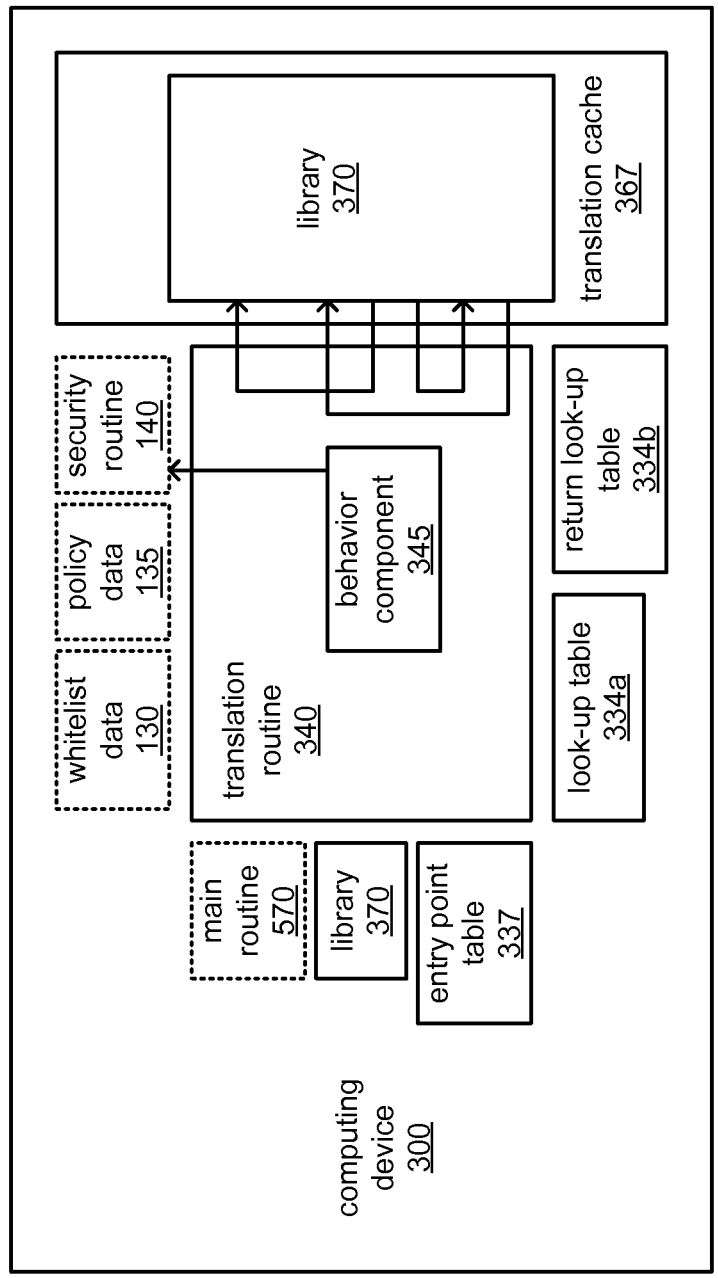

FIGS. 2, 3, 4, 5 and 6 are each a simplified block diagram of an embodiment of the ROP detection system 1000 of FIG. 1. Each of these figures depicts aspects of the operation of the ROP detection system 1000 at different phases. More specifically, FIG. 2 depicts aspects of preparations for checking target addresses, including loading known valid target addresses into the look-up table 334a. FIG. 3 depicts aspects of translating portions of one or both of the main routine 570 and the library 370, and placing those portion(s) in the translation cache 367. FIG. 4 depicts aspects of checking a target address of a branch instruction of a translated portion of the main routine 570 placed in the translation cache 367. FIG. 5 depicts aspects of checking a target address of a return instruction of a translated portion of the library 370 placed in the translation cache 367. FIG. 6 depicts aspects of monitoring the frequency of execution of return instructions among portions of function routines of a translated portion of the library 370 loaded into the translation cache 367.

Turning to FIG. 2, an initialization component 341 of the translation routine 340 may retrieve target addresses known to be valid from the entry point table 337 and/or the whitelist data 130 prior to translation or execution of one or more routines (e.g., the main routine 570) to pre-load the look-up table 334a with at least some valid target addresses. As has been discussed, the entry point table 337 and/or the whitelist data 130 may provide indications of valid target addresses of valid entry points of function routines of the library 370 where there is a first instruction of each sequence of instructions of each function routine at which execution is normally expected to begin. It is envisioned that the entry point table 337 is a table (implemented as any of a wide variety of data structures) indicating valid target addresses of valid entry points that may be stored within the storage 360 either entirely separately from the library 370 or integrated into a portion of the library 370 in different possible embodiments. It should also be noted that in some embodiments, the indications of valid target addresses in the entry point table 337 may be for valid entry points of more than one library and/or of one or more routines (e.g., the main routine 570). Alternatively or additionally, the initialization component 341 may retrieve addresses of pre-cleared indirect branch instructions, thereby providing either the translation routine 340 or the security routine 140 with addresses against which addresses of the indirect branch instructions, themselves, may be compared to determine whether checking of their target addresses is necessary, or not.

It is envisioned that the whitelist data 130 may provide indications of valid target addresses of valid entry points of the library 370 and/or of one or more other libraries and/or routines (e.g., the main routine 570). Again, the whitelist data 130 may be provided to the computing device 300 along with one or both of the policy data 135 and the security routine 140. Alternatively or additionally, the whitelist data 130 may be at least partially generated once the addresses at which the library 370 and/or other libraries are stored in the storage 360 are known. It is also envisioned that the whitelist data 130, the policy data 135 and/or the security routine 140 may be products or portions of products offered by an entity providing computing device security services, possibly on a subscription basis in which one or more of these is recurringly updated. In embodiments in which one or more of the whitelist data 130, the policy data 135, the security routine 140 and the main routine 570 are received by the computing device 300 from one or more other computing devices (e.g., the security server 100 and/or the routines server 500), a communications component 349 either incorporated into the translation routine 340 or otherwise associated with the computing device 300 may operate the interface 349 to enable receipt of one or more of these via the network 999.

In some embodiments, the whitelist data 130 may include indications of identities of routines and/or libraries that are deemed legitimate inasmuch as they are deemed to not include malicious routines. Such indications may be names of files, bit patterns, cyclic redundancy check (CRC) values, etc. able to be used as identification. In such embodiments, the provision of such indications of identities may be used by the translation routine 340 to distinguish routines and/or libraries of routines that should be executed from others that should not be such that they should not be translated by the translation routine 340. Alternatively, in such embodiments, the translation routine 340 may signal the security routine 140 to perform the task of distinguishing routines and/or libraries that should be executed from those that shouldn't.

In addition to the preparatory actions of the initialization component 341, one or both of a comparison component 344 and a behavior component 345 may retrieve indications of what types of analyses are to be performed by each to detect a ROP attack and/or what actions are to be taken by each in response to detecting a ROP attack. As will be explained in greater detail, the comparison component checks target addresses of branch instructions against indications of known valid target addresses in at least one or both of the look-up table 334a and the return look-up table 334b. As will also be explained in greater detail, the behavior component checks for instances of excessively frequent executions of return instructions that may be indicative of a pattern of behavior consistent with a ROP attack in progress.

Turning to FIG. 3, a translation component 347 translates portions of one or both of the main routine 570 and the library 370 based on addresses at which one or both has been loaded within the storage 360, and places the translated portions in the translation cache 367 for execution by the processor component 350. Since it is often not possible to know the addresses at which routines (e.g., the main routine 570) will be stored in a storage of a computing device at the time they are written or compiled, indications of targets of branch instructions must be indicated in a routine as an offset from the beginning of that routine, as a name or other identifier given to a function, other in any of a variety of other ways that does not entail actually specifying a target address. The translation component 347 examines the branch instructions and accompanying indications of their targets in portions of a routine and, where possible, determines the actual target addresses of those targets based at least on the address at which the routine and/or other routines (e.g., function routines of a library) are stored in the storage 360. As previously discussed, there can be portions of a routine that include indirect branch instructions (or other types of instructions) for which a target address cannot be derived at the time those portions are translated. Where a valid target address can be determined during translation of a portion by retrieving it from a table such as the entry point table 337 and/or the whitelist 130, that retrieved valid target address is stored in the look-up table 334a. Where a target address cannot be determined during translation of a portion, then valid target addresses retrieved from such sources as the entry point table 337 and/or the whitelist 130 during execution are relied upon.

As the translation component 347 translates portions of a routine, it substitutes stub instructions 364 for at least some indirect branch instructions. In some embodiments, there may be different types of stub instruction 364 corresponding to one or more different types of branch instruction that they are substituted for in translated portions of a routine. By way of example, there may be particular types of the stub instruction 364 for one or more of direct and/or indirect types of "unconditional jump" instruction, conditional branch instructions, call instructions, return instructions, etc.

The replacement of branch instructions with the stub instructions 364 is a measure to enable the translation routine 340 to maintain control over the flow of execution of a translated routine. Although the stub instructions 364 may indicate the type of branch instructions that they replace, the stub instructions 364 actually cause the flow of execution to be directed back to the translation routine 340. This provides the translation routine 340 (e.g., the comparison component 344) with an opportunity to perform its check of the target address derived during execution that the branch instruction would have directed the flow of execution to, and to determine whether or not to allow execution of that branch instruction based at least on whether the target address derived during execution is deemed valid. Thus, as depicted, the translation component 347, upon translating a portion of the main routine 570 and/or the library 370, inserts a stub instruction 364 in place of a branch instruction as the translation component 347 places the translated portion(s) in the translation cache 367 for execution by the processor component 350.

Where an indirect branch instruction is a "call" instruction to a function routine that is expected to later be paired with a "return" instruction following completion of that function routine (e.g., a function routine of the library 370), the translation component 347 may additionally derive the return target address of that return instruction and store that return target address in the return look-up table 334b as a known valid target address for that return instruction. During normal operation, the return target address should indicate the address of the instruction immediately following the call instruction in whatever routine in which the call instruction exists. Stated differently, the return instruction that is paired with a call instruction should return the flow of execution back to the routine in which the call instruction exists and to the location of the instruction in that routine that immediately follows that call instruction. Given that the valid target address of a return instruction that corresponds to a call instruction is invariably the address of whatever instruction that immediately follows that call instruction, it is possible to determine the valid target address of the corresponding return instruction with certainty.

It should be noted that the translation component 347 recurringly retrieves more portions of the main routine 570 and/or the library 370 from the storage 360 for translation and placement in the translation cache 367 as the processor component 350 continues to execute portions of one or both. Stated differently, the translation component 347 recurringly refills the translation cache 367 with portions of one or both of the main routine 570 and the library 370 for the processor component 350 to execute as such execution progresses. In some embodiments, a stub instruction 364 of a type unrelated to any branch instruction may be inserted in a translated portion of the main routine 570 and/or the library 370 to trigger the retrieval and translation of another portion in response to execution of a portion in the translation cache 367 having reached that stub instruction 364. Stated differently, such a stub instruction 364 may be employed as an indicator to the translation component 347 that the end of a translated portion already placed in the translation cache 367 has been reached and that another portion needs to be translated and placed in the translation cache 367 to enable further execution.

In other embodiments, where the translation component 347 is able to retrieve the target address for the target of an indirect branch instruction of a routine (e.g., the main routine 570), the translation component 347 substitutes a combination of a direct conditional branch instruction 366 followed immediately thereafter by a stub instruction 364 in the translated portion of that routine placed in the translation cache 367, instead of simply a stub instruction 364. Where the conditional of the direct branch instruction 366 reveals a match at execution, the target address derived during execution is deemed valid and the flow of execution is redirected to the target intended by the replaced indirect branch instruction. The direct conditional branch instruction 366, itself, performs a check of whether the target address to which the replaced branch instruction would have directed the flow of execution is a valid target address by itself comparing that would-be target address to the known valid target address that was determined by the translation component 347. To do this, the direct conditional branch 366 itself incorporates the known valid target address that was determined by the translation component 347 by retrieving it from a table such as the entry point table 337 or the whitelist 130 during translation. If the comparison results in a match (e.g., the two compared target addresses are found to be equal), then the direct conditional branch 366 itself performs the directing of the flow of execution to that now validated target address. However, if the comparison reveals that these two target addresses do not match, then the branching component of the conditional branch 366 is not executed, and the flow of execution proceeds to the immediately following stub instruction 364 that directs the flow of execution back to the translation routine 340 (e.g., the comparison component 344) where the target address to which the replaced branch instruction would have directed execution is able to be further examined. Such further examination may entail searching the look-up table 334a and/or a table such as the entry point table 337 or the whitelist data 130 for a match.

Such replacement of an indirect branch instruction in a portion of a routine with the combination of the direct conditional branch 366 and immediately following stub instruction 364 in the translated portion of that routine placed in the translation cache 367 effectively embeds a comparison of the target address derived during execution to the known valid target address into the translated portion of the routine. This enables the directing of the flow of execution through the translation routine 340 (e.g., the comparison component 344) to be avoided, presuming the comparison reveals a match, thereby speeding execution of the translated portion by simplifying execution. In effect, a comparison made by translation routine 340 is embedded "inline" into the translated portion.

Turning to FIG. 4, the comparison component 344 validates the target address associated with an indirect branch instruction replaced by a stub instruction 364 of the main routine 570, and that was derived during execution up to the stub instruction 364. Where the translation component 347 was able to determine a known valid target address of the target of the indirect branch instruction replaced by the stub instruction 364 during translation, the comparison component 344 is able to determine whether that target address of the stub instruction 364 has a match in the look-up table 334a.

However, where the translation component 347 was not able to determine a known valid target address of a target of an indirect branch instruction replaced by the stub instruction 364 during translation, there is unlikely to be a match in the look-up table 334a for the target address derived during execution of instructions up to the stub instruction. In response, the comparison component 334 may signal the translation component 347 to again attempt to determine a known valid target address by again attempting to retrieve it from one or more tables (e.g., the entry point table 337, the whitelist data 130, etc.) and possibly place that known valid target address in the look-up table 334a. Upon being provided with a known valid target address (that may have just been added to the look-up table 334a by the translation routine 347), the comparison component 344 is able to determine whether the indirect branch instruction replaced by the stub instruction 364 would direct the flow of execution to a target address that is valid, or not, based on whether the target address of that target matches the known valid target address just determined by the translation component 347 (and maybe placed in the look-up table 334a).

Whether a known valid target address placed in the look-up table 344a was able to be determined during translation or had to be later determined during execution of a portion of a routine 570, it should match the target address derived during execution up to the point of the stub instruction 364 as the target address for the target to which an indirect branch instruction intends to direct the flow of execution. If there is a match, then that target address of the target to which that indirect branch instruction would direct the flow of execution is deemed to have been validated, and that indirect branch instruction is allowed to be executed by the processor component 350.

If that target address has no match in the look-up table 334a, then it may be deemed to be an invalid target address, and the comparison component may take any of a variety of actions in response. In some embodiments, the comparison component 344 may trigger a termination of execution of the main routine 570, in which case, the translation component is caused to cease translating further portions of the main routine 570, and translated portions of the main routine 570 that are already placed in the translation cache 367 may be removed from there or simply overwritten by portions of other routines. In other embodiments, the comparison component 344 may signal the security routine 140 to perform an analysis of the main routine 570 to determine whether to continue execution of the main routine 570, including the branch instruction associated with the target address for which no match among known valid target addresses was found. Such continued execution may be the response where the main routine 570 is indicated as safe in the whitelist 130 or is in some other way determined by the security routine 140 to not be a security risk. One or more of these actions and/or other actions may be taken by various embodiments as specified by the policy data 135.

It should again be noted that where a call instruction of one routine is meant to cause a transfer of the flow of execution to instructions of another routine (e.g., a call instruction of the main routine 570 seeking to direct a flow of execution to a function routine of the library 370), then the translation component 347 will have been triggered to retrieve portions of that other routine during translation, unless the translation component 347 had already done so. As depicted as an example in FIG. 4, the depicted stub instruction 364 placed within the depicted portion of the main routine 570 is a substitute for a call instruction that is meant to direct the flow of execution to a targeted function routine of the library 370. However, it may be that no portion of the library 370 has yet been translated and placed in the translation cache 367 for execution, causing a portion of the library 370 that includes the target of the call instruction to be retrieved, translated and placed into the translation cache 367 by the translation component 347 during translation to enable the call instruction to be executed to jump to that function routine.

FIG. 5 depicts the later comparison performed by the comparison component 344 of a stub 364 in a translated portion of the library 370 that corresponds to a return instruction of the library 370 paired to a call instruction of a translated portion of the main routine 570. The comparison component 344 checks that the target address associated with that return instruction has a match in the return look-up table 334b that was earlier derived and stored therein in response to encountering the call instruction during translation, as earlier described in reference to FIG. 3. In a manner substantially similar to such checks made of target addresses derived during execution for matches among valid target addresses in the look-up table 334a, a failure to find a match to a target address associated with a return instruction in the return look-up table 334b may result in that target address being deemed an invalid target address, and again, the comparison component 344 may take any of a variety of actions in response.

As previously discussed, a hallmark of ROP attacks is to modify the target addresses of return instructions as part of causing a flow of execution to jump among pieces of legitimate code to perform a malicious function. Therefore, an instance of a target address associated with a return instruction being deemed invalid may be presumed to be an indication of an attempted ROP attack. However, it should be noted that instances of target addresses associated with other types of branch instruction being deemed invalid through there being a lack of a match for them among the known valid target addresses in the look-up table 334a may also be deemed an indication of an attempted ROP or similar attack. By way of example, a ROP attack may include one or more instances of manipulation of a target address associated with a "jump" instruction. Although manipulation of a target address of a jump instruction may be separately categorized as a "jump-oriented programming" (JOP) attack, a pure JOP attack is far more rare than a ROP attack due simply to the far greater prevalence of return instructions in typical legitimate routines. Thus, manipulation of target addresses associated with one or more jump instructions may very well accompany the manipulation of target addresses associated with return instructions such that a ROP attack may include instances of JOP. Therefore, an instance of a target address associated with one or more types of branch instruction other than a return instruction may also be deemed an indication of an attempted ROP attack in some embodiments.

It should be noted that despite the depiction of a separate look-up table for target addresses associated with return instructions, other embodiments are possible in which the look-up table 334a and the return look-up table 334b are one and the same. Alternatively, still other embodiments may have further specialization in such look-up tables, possibly having separate look-up tables for various different types of branch instructions, such as unconditional jump instructions, conditional branch instructions and/or call instructions in addition to a separate look-up table for return instructions. Also, regardless of how many look-up tables there may be, it should again be noted that each of them may be data structures of any of a variety of types in which indications of valid target addresses are stored. Further, one or more of such look-up tables may incorporate a at least one level of caching by which more recently accessed target addresses may be retrieved more quickly, especially by the comparison component 344 during execution of translated portions of routines placed in the translation cache 367.

Turning to FIG. 6, the behavior component 345 monitors the frequency with which return instructions occur to determine whether a ROP attack may be underway. Since ROP attacks are based on manipulating target addresses associated with return instructions to repeatedly direct a flow of execution about portions of legitimate code to perform a malicious function, ROP often result in the frequent execution of return instructions.

The behavior component 345 may recurringly compare the frequency with which return instructions are executed to determine whether that frequency exceeds a threshold of frequency of execution of return instructions such that the observed use of return instructions is deemed consistent with a ROP attack in progress. Such a threshold may be specified as a number of executions of return instructions per a specified time period or per a specified number of clock or processing cycles of the processor component 350. Upon determining that such a threshold has been exceeded, the behavior component may trigger the translation routine 340 to terminate the flow of execution that includes the excessive use of return instructions and/or may signal the security routine 140 to determine whether or not the observed frequent use of return instructions is part of a ROP attack.

Figure 7:
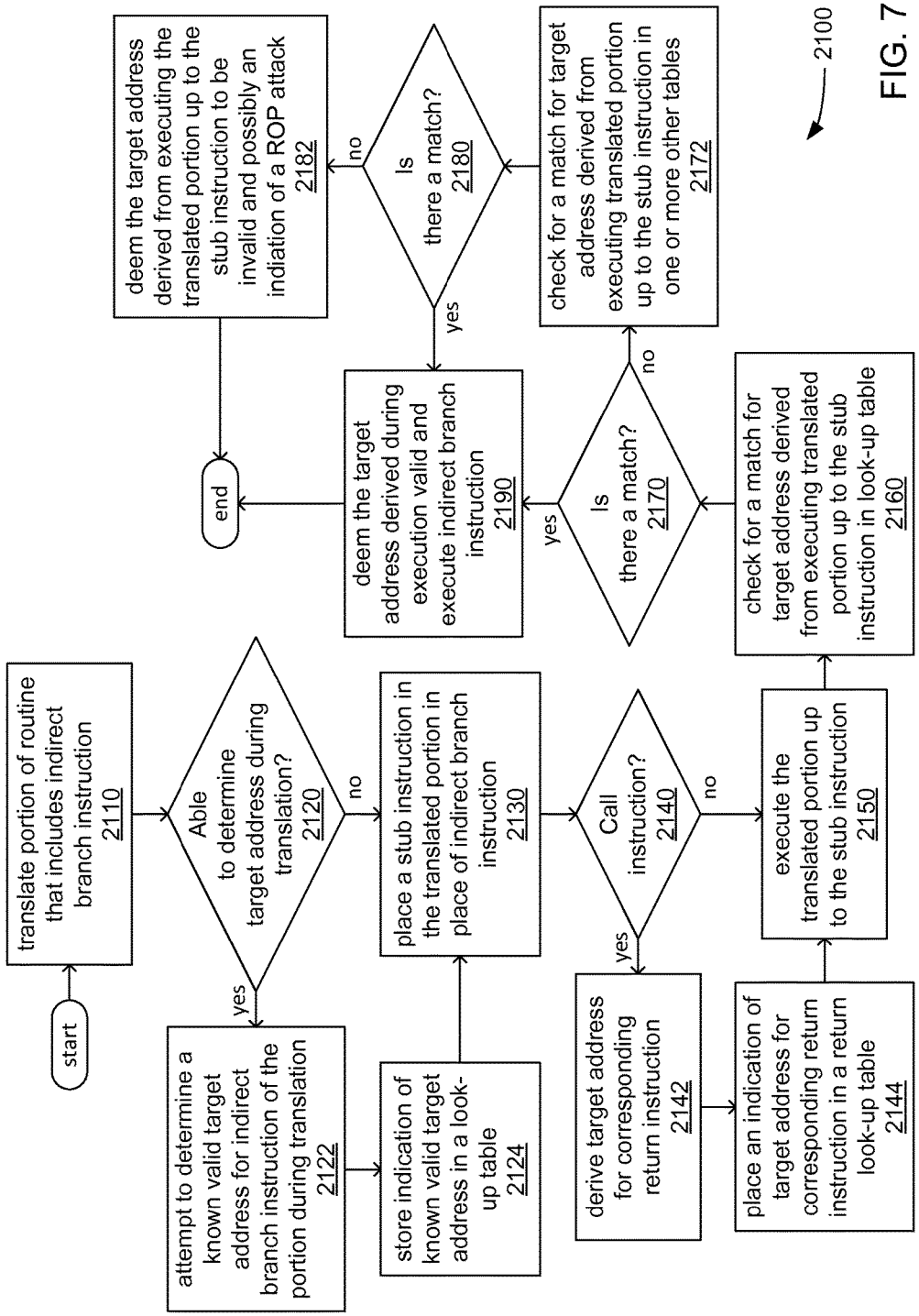
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the translation routine 340, and/or performed by other component(s) of the computing device 300.

At 2110, a processor component of a computing device of a ROP detection system (e.g., the processor component 350 of the computing device 300 of the ROP detection system 1000) is caused by execution of a translation routine (e.g., the translation routine 340) to translate a portion of a routine (e.g., the main routine 570) that includes an indirect branch instruction and place the translated portion in a translation cache (e.g., the translation cache 367). As has been discussed, it is envisioned that routines are translated a portion at a time, with each translated portion being placed in a translation cache where the processor component later executes it. In so doing, a check is made at 2120 as to whether it is possible to determine a known valid target address for the indirect branch instruction during translation of the portion. As has also been discussed, it may not be possible in the case of indirect branch instructions to determine their target addresses until the instructions preceding them have been executed. If it is possible to determine a known valid target address of the indirect branch instruction at 2120, then at 2122, that known valid target address is determined by using whatever indicator of the target that is provided by the indirect branch instruction to locate that known valid target address in one or more tables (e.g., the entry point table 337, the whitelist 130, etc.). Upon retrieving that known valid target address from whatever table, an indication of that known valid target address is stored in a look-up table at 2124 (e.g., the look-up table 334a).

At 2130, a stub instruction is placed in the translated portion in place of the indirect branch instruction. As has been discussed, a stub instruction (e.g., the stub instruction 364) is placed in the translated portion as a substitute for the original indirect branch instruction to avoid having that indirect branch instruction being immediately executed. Instead, the stub instruction causes the flow of execution to be directed back to the translation routine that translated and oversees execution of that translated portion (e.g., the translation routine 340). At 2140, still during translation, a check is made as to whether the indirect branch instruction is a call instruction. If it is, then the target address for a corresponding return instruction is derived at 2142, and an indication of that target address for that corresponding return instruction is stored in a return look-up table (e.g., the return look-up table 334b) at 2144. As has been discussed, it is expected that a return instruction corresponding to a call instruction should use the address of whatever instruction immediately follows the call instruction as its target address. Thus, the target address of a corresponding return instruction is able to be reliably derived during translation. At 2150, the translated portion is executed up to the stub instruction. Again, the stub instruction causes the flow of execution to be directed back to the translation routine.

At 2160, a check is made of the known valid target addresses stored in the look-up table to find a match for the target address of the target to which the indirect branch instruction would have directed the flow of execution and that was derived during execution of the translated portion up to the stub instruction. If there is a match at 2170 to one of the known valid target addresses in the look-up table, then that target address derived during execution is deemed to be valid, and the indirect branch instruction is executed at 2190. However, if at 2170, no match to the target address of the target to which the indirect branch instruction would direct execution is found in the look-up table, then a check is made at 2172 of known valid target addresses stored in one or more other tables (e.g., the entry point table 337, the whitelist 130, etc.) to attempt to find a match. If, there is a match at 2180 to one of the known valid target addresses in one of those tables, then that target address derived during execution is deemed to be valid, and the indirect branch instruction is executed at 2190. However, if at 2180, there is still no match found, then the target to which the indirect branch instruction would direct the flow of execution and that was derived during execution of the translated portion up to the stub instruction is deemed invalid at 2182. As has been discussed, a target address being found invalid in this manner may be deemed an indication of an attempted ROP attack, at least if that indirect branch instruction is a return instruction. However, as also previously discussed, the identifying of an invalid target address associated with one or more other types of branch instruction may also be assumed as an indication of an attempted ROP attack, despite not being return instructions.

Figure 8:
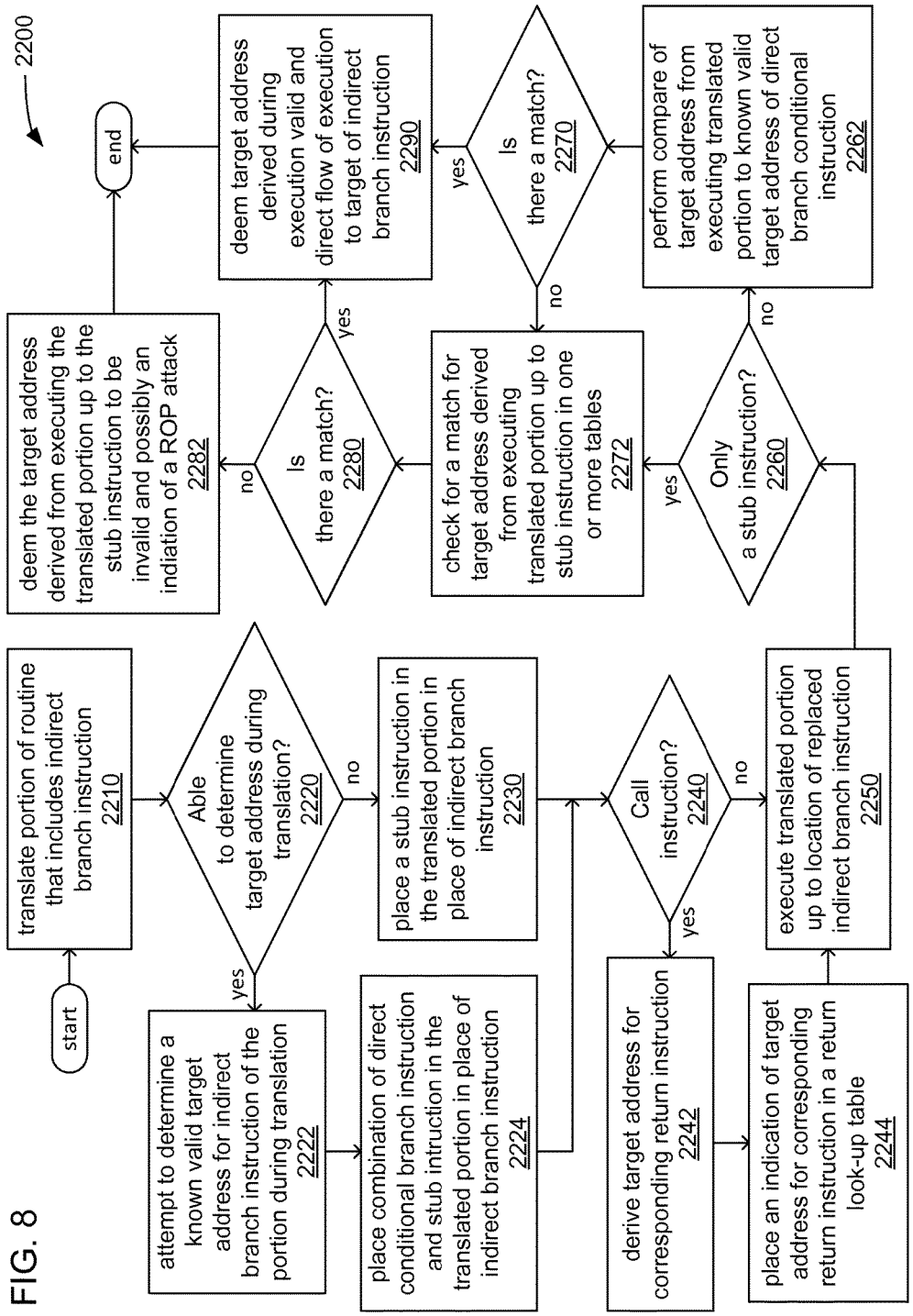

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 350 in executing at least the translation routine 340, and/or performed by other component(s) of the computing device 300.

At 2210, a processor component of a computing device of a ROP detection system (e.g., the processor component 350 of the computing device 300 of the ROP detection system 1000) is caused by execution of a translation routine (e.g., the translation routine 340) to translate a portion of a routine (e.g., the main routine 570) that includes an indirect branch instruction and place the translated portion in a translation cache (e.g., the translation cache 367). In so doing, a check is made at 2220 as to whether it is possible to determine a known valid target address for the indirect branch instruction during translation of the portion. As has been discussed, it may not be possible in the case of indirect branch instructions to determine their target addresses until the instructions preceding them have been executed.

If it is possible to determine a known valid target address of the indirect branch instruction during translation at 2220, then at 2222, that known valid target address is determined by using whatever indicator of the target that is provided by the indirect branch instruction to locate that known valid target address in one or more tables (e.g., the entry point table 337, the whitelist 130, etc.). Upon retrieving that known valid target address from whatever table, a combination of a direct conditional branch instruction (e.g., the direct conditional branch instruction 366) and a stub instruction (e.g., the stub instruction 364) immediately following the direct conditional branch instruction is placed in the translated portion in place of the indirect branch instruction as that translated portion is placed in the translation cache. However, if it is not possible to determine a known valid target address of the indirect branch during translation instruction at 2220, then at 2230, a stub instruction to direct the flow of execution back to the translation routine is placed in the translated portion in place of the indirect branch instruction as that translated portion is placed in the translation cache.

Regardless of whether the indirect branch instruction is replaced with a combination of a direct conditional branch instruction and stub instruction or just a stub instruction, a check is made at 2240 as to whether the indirect branch instruction is a call instruction. If it is, then the target address for a corresponding return instruction is derived at 2242, and an indication of that target address for that corresponding return instruction is stored in a return look-up table (e.g., the return look-up table 334b) at 2244. As has been discussed, it is expected that a return instruction corresponding to a call instruction should use the address of whatever instruction immediately follows the call instruction as its target address. Thus, the target address of a corresponding return instruction is able to be reliably derived during translation. At 2250, the translated portion is executed up to the location of the replaced indirect branch instruction. As has been discussed, either a stub instruction or a combination of a direct conditional branch instruction and a stub instruction may have been substituted for the indirect branch instruction at that location.

At 2260, a check is made of whether the indirect branch instruction was replaced with only a stub instruction or a combination of a direct conditional branch instruction and immediately following stub instruction. Given that replacement of the indirect branch instruction with one or the other is conditioned on whether a valid target address was able to be determined during translation, the check at 2260 is effectively a check of whether a known valid target address was able to be determined during translation. If, at 2260, the indirect branch instruction was replaced with only a stub instruction, then a check is made at 2272 of known valid target addresses stored in one or more tables (e.g., the entry point table 337, the whitelist 130, etc.) to attempt to find a match. If, there is a match at 2280 to one of the known valid target addresses in one of those tables, then that target address derived during execution is deemed to be valid at 2290, and the flow of execution is directed to the target to which the indirect branch instruction would have directed it. If there is no match at 2280, then the target address derived during execution and which indicates the target to which the indirect branch instruction would direct execution is then deemed to be invalid at 2282.

However, if at 2260, the indirect branch instruction was replaced with a combination of direct conditional branch instruction and stub instruction that embeds a comparison of the target address derived during execution with a known valid target address determined during translation within the translated portion inline, then at 2262, that comparison of that direct conditional branch instruction is performed. If that inline comparison reveals a match at 2270, then the target address derived during execution is deemed to be valid at 2290, and the flow of execution is directed to the target to which the indirect branch instruction would have directed it (specifically, the branch of the direct conditional branch instruction is taken). If that inline comparison reveals no match at 2270, then a check is made at 2272 of known valid target addresses stored in one or more tables (e.g., the entry point table 337, the whitelist 130, etc.) to attempt to find a match. It should be noted that the tables checked at 2272 as a result of no match at 2270 could include the return look-up table if the indirect branch instruction is a return instruction.

Figure 9:
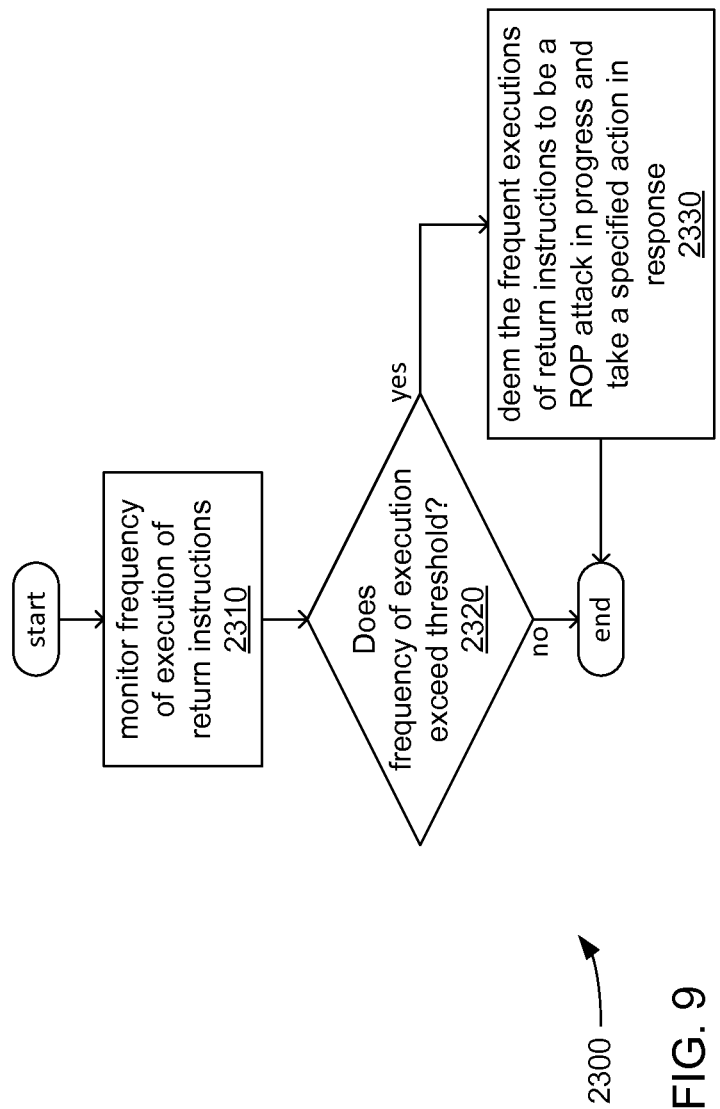

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 350 in executing at least the control routine 340, and/or performed by other component(s) of the computing device 300.

At 2310, a processor component of a computing device of a ROP detection system (e.g., the processor component 350 of the computing device 300 of the ROP detection system 1000) monitors the frequency with which return instructions are executed at 2310. As has been discussed, a hallmark of ROP attacks is frequent use of return instructions as part of jumping about routines (e.g., function routines of the library 370) to execute only portions of the sequences of instructions of each of those routines, those portions of sequences being chosen to actually cause the performance of a malicious function.

If, at 2320, the frequency of occurrence of executions of return instructions remains below a specified threshold, then execution is allowed to continue uninterrupted. However, if the frequency of such occurrences rises above that threshold, then those frequent occurrences are deemed to be a ROP attack in progress, and one or more specified actions are taken at 2330 in response.

Figure 10:
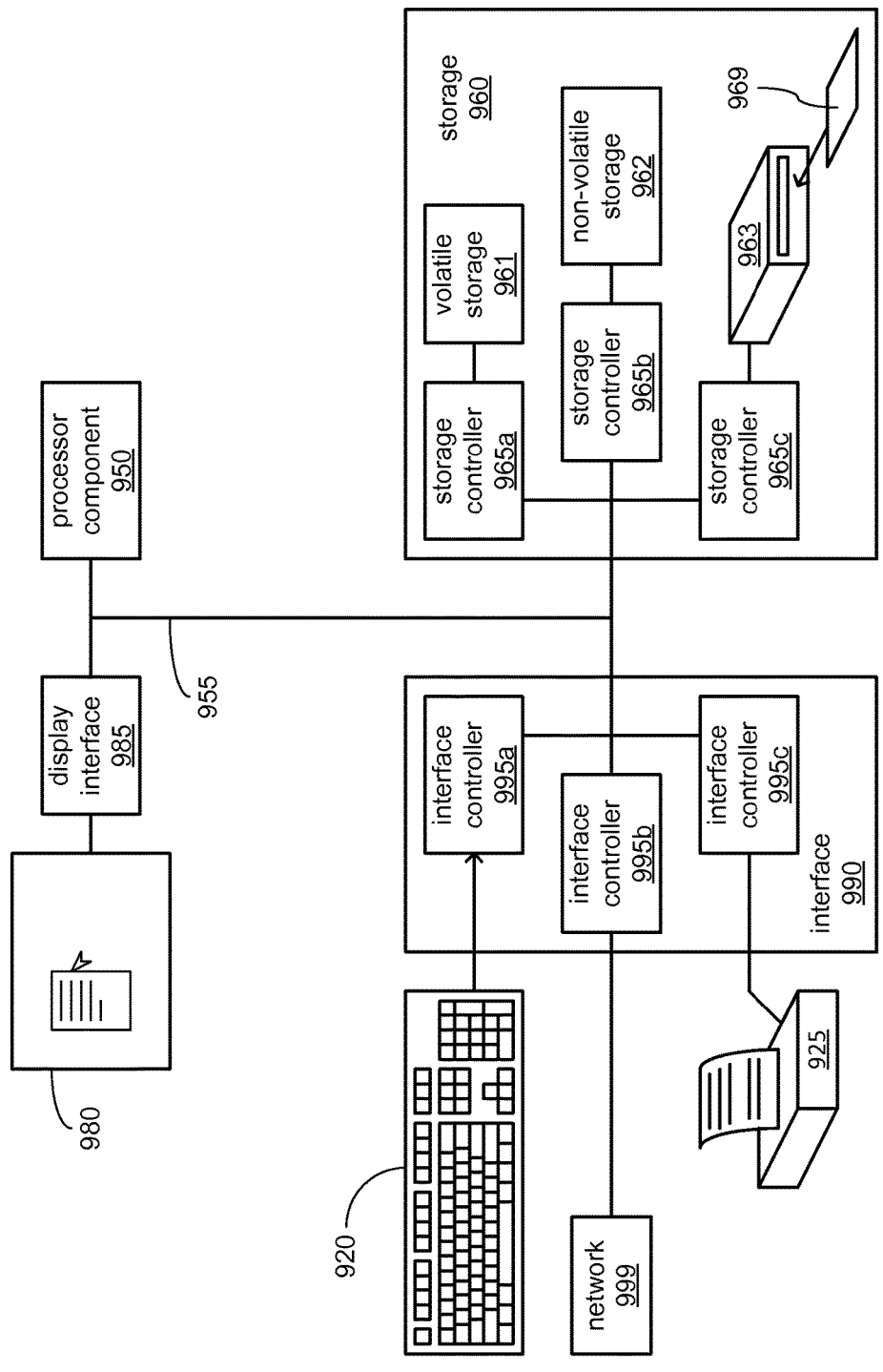
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of the computing device 300. It should be noted that components of the processing architecture 3000 are given reference numbers in which the last two digits correspond to the last two digits of reference numbers of at least some of the components earlier depicted and described as part of the computing device 300. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985. The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 350) may include any of a wide variety of commercially available processors, employing any of a wide variety of technologies and implemented with one or more cores physically combined in any of a number of ways. As previously discussed, the storage 960 (corresponding to the storage 360) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 390) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 380), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to detect a return-oriented programming attack includes a processor component and a comparison component for execution by the processor component to determine whether there is a matching valid target address for a target address of a branch instruction associated with a translated portion of a routine in a table including valid target addresses.

The above example of an apparatus in which the comparison component is to allow execution of the branch instruction in response to a determination that there is a matching valid target address in the table.

Either of the above examples of an apparatus in which the comparison component is to terminate execution of the routine by the processor component in response to a determination that there is no matching valid target address in the table.

Any of the above examples of an apparatus in which the apparatus includes a security routine for execution by the processor component to determine whether the routine is safe to continue to execute in response to a determination that there is no matching valid target address in the table.

Any of the above examples of an apparatus in which the apparatus includes a translation cache; and a translation component communicatively coupled to the translation cache for execution by the processor component to translate a portion of the routine into the translated portion of the routine, and place the translated portion in the translation cache to enable execution of the translated portion by the processor component.

Any of the above examples of an apparatus in which the translation component is to substitute a stub instruction for the branch instruction in the translated portion to prevent immediate execution of the branch instruction and trigger determination of whether there is a matching valid target address in the table.

Any of the above examples of an apparatus in which the apparatus includes a return look-up table including valid target addresses for return instructions and coupled to the comparison component, the comparison component to determine whether the branch instruction is a call instruction, and the translation component to derive and store another valid target address for a return instruction in the return look-up table in response to a determination that the branch instruction is a call instruction.

Any of the above examples of an apparatus in which the comparison component is to determine whether there is a matching valid target address for a target address of a return instruction associated with a translated portion of another routine in the return look-up table.

Any of the above examples of an apparatus in which the apparatus includes a behavior component for execution by the processor component to determine whether a frequency of execution of return instructions exceeds a specified threshold.

Any of the above examples of an apparatus in which the apparatus includes an interface communicatively coupled to the processor component to receive the valid target address from a computing device via a network.

An example of another apparatus to detect a return-oriented program attack includes a processor component, and a comparison component for execution by the processor component to determine whether there is a matching valid target address for a target address of a return instruction associated with a translated portion of a library in a return look-up table including valid target addresses derived from a call instruction associated with a translated portion of a routine.

The above example of another apparatus in which the comparison component is to allow execution of the return instruction in response to a determination that there is a matching valid target address in the return look-up table.

Either of the above examples of another apparatus in which the comparison component is to terminate execution of instructions of the library by the processor component in response to a determination that there is no matching valid target address in the return look-up table.

Any of the above examples of another apparatus in which the apparatus includes a translation cache; a table including valid target addresses; and a translation component for execution by the processor component and communicatively coupled to the translation cache and the return look-up table, the translation component to translate a portion of the routine into the translated portion of the routine and place the translated portion in the translation cache, and to derive a valid target address of the call instruction and store indications of the valid target address of the call instruction in the table.

Any of the above examples of another apparatus in which the translation component is to substitute a stub instruction for the call instruction in the translated portion of the routine to prevent immediate execution of the call instruction and trigger determination of whether there is a matching valid target address in the table for the target address of the call instruction indicated in the translated portion of the routine.

Any of the above examples of another apparatus in which the translation component is to derive the valid target address of the return instruction in response to the association of the call instruction with the translated portion of the routine.

Any of the above examples of another apparatus in which the translation component is to retrieve and translate the portion of the library, and place the translated portion of the library in the translation cache.

Any of the above examples of another apparatus in which the apparatus includes a behavior component for execution by the processor component to determine whether a frequency of execution of return instructions exceeds a specified threshold.

Any of the above examples of another apparatus in which the apparatus includes an initialization component for execution by the processor component to retrieve an indication of the specified threshold from a policy data, and an interface communicatively coupled to the processor component to receive the policy data from a computing device.

An example of a computer-implemented method for detecting a return-oriented programming attack includes translating, by a processor component, a portion of a routine comprising a branch instruction based on an address at which the routine is stored in a storage of a computing device; and determining whether there is a matching valid target address for a target address of the branch instruction in a table comprising valid target addresses.

The above example of a computer-implemented method in which the method includes executing the branch instruction in response to determining that there is a matching valid target address in the table.

Either of the above examples of a computer-implemented method in which the method includes terminating execution of the routine in response to determining that there is no matching valid target address in the table.

Any of the above examples of a computer-implemented method in which the method includes placing the translated portion in a translation cache to enable execution of the translated portion by a processor component, deriving the valid target address of the branch instruction, and storing an indication of the valid target address in the table, the table including a look-up table.

Any of the above examples of a computer-implemented method in which the method includes substituting a stub instruction for the branch instruction in the translated portion to prevent immediate execution of the branch instruction and triggering determination of whether there is a matching valid target address in the table.

Any of the above examples of a computer-implemented method in which the method includes determining whether the branch instruction is a call instruction, and deriving another valid target address for a return instruction and storing the other valid target address in a return look-up table comprising valid target addresses for return instructions in response to determining that the branch instruction is a call instruction.

Any of the above examples of a computer-implemented method in which the method includes determining whether there is a matching valid target address for a target address of a return instruction associated with a translated portion of another routine in the return look-up table.

Any of the above examples of a computer-implemented method in which the method includes determining whether a frequency of execution of return instructions exceeds a specified threshold, and receiving the threshold from a computing device via a network.

An example of an apparatus for detecting a return-oriented programming attack includes means for performing any of the above examples of a computer-implemented method.

An example of at least one machine-readable storage medium includes instructions that when executed by a computing device, causes the computing device to perform any of the above examples of a computer-implemented method.

An example of at least one machine-readable storage medium includes instructions that when executed by a computing device, cause the computing device to translate a portion of a routine comprising a branch instruction based on an address at which the routine is stored in a storage of a computing device, and determine whether there is a matching valid target address for a target address of the branch instruction in a table comprising valid target addresses.

The above example of at least one machine-readable storage medium in which the computing device is caused to execute the branch instruction in response to determining that there is a matching valid target address in the table.

Either of the above examples of at least one machine-readable storage medium in which the computing device is caused to terminate execution of the routine in response to determining that there is no matching valid target address in the table.

Any of the above examples of at least one machine-readable storage medium in which the computing device is caused to place the translated portion in a translation cache to enable execution of the translated portion by a processor component, derive the valid target address of the branch instruction, and store an indication of the target address in the table, the table including a look-up table.

Any of the above examples of at least one machine-readable storage medium in which the computing device is caused to 35. The at least one machine-readable storage medium of claim 34, the computing device caused to substitute a stub instruction for the branch instruction in the translated portion to prevent immediate execution of the branch instruction and trigger determination of whether there is a matching valid target address in the table.

Any of the above examples of at least one machine-readable storage medium in which the computing device is caused to determine whether the branch instruction is a call instruction, and derive another valid target address for a return instruction and storing the other valid target address in a return look-up table comprising valid target addresses for return instructions in response to determining that the branch instruction is a call instruction.

Any of the above examples of at least one machine-readable storage medium in which the computing device is caused to determine whether there is a matching valid target address for a target address of a return instruction associated with a translated portion of another routine in the return look-up table.

Any of the above examples of at least one machine-readable storage medium in which the computing device is caused to determine whether a frequency of execution of return instructions exceeds a specified threshold, and receive the threshold from a computing device via a network.

An example of an apparatus to detect a return-oriented programming attack includes means for translating a portion of a routine comprising a branch instruction based on an address at which the routine is stored in a storage of a computing device, and determining whether there is a matching valid target address for a target address of the branch instruction in a table comprising valid target addresses.

The invention claimed is:

1. An apparatus comprising:
   a translated portion of a routine for execution by a processor component, the routine to include a branch instruction and the translated portion of the routine to include a stub instruction associated with the branch instruction;
   a comparison component for execution by the processor component, the stub instruction to direct a flow of execution of the processor component from the translated portion to the comparison component, and, in response to direction of the flow of execution to the comparison component, the comparison component to determine whether there is a matching valid target address for a target address of the branch instruction associated with the stub instruction of the translated portion of the routine in a table comprising valid target addresses; and a security routine for execution by the processor component, the comparison component to direct the flow of execution of the processor component to the security routine in response to a failure to identify a matching valid target address for the target address of the branch instruction, and the security routine to determine whether to return the flow of execution of the processor component to the translated portion based on a whitelist and the target address of the branch instruction, the whitelist comprising a plurality of valid target addresses associated with valid entry points to a library, and wherein when the whitelist fails to include a valid target address that matches the target address of the branch instruction the security routine to identify an indication of a return oriented programming (ROP) attack and when the whitelist includes a valid target address that matches the target address of the branch instruction the security routine returns the flow of execution of the processor component to the translated portion.

2. The apparatus of claim 1, the comparison component to allow execution of the branch instruction in response to a determination that there is a matching valid target address in the table.

3. The apparatus of claim 1, comprising:
a translation cache; and
a translation component communicatively coupled to the translation cache for execution by the processor component to translate a portion of the routine with the branch instruction into the translated portion of the routine, and place the translated portion in the translation cache to enable execution of the translated portion by the processor component.

4. The apparatus of claim 3, the translation component to derive the valid target address of the branch instruction and store indications of the target address in the table, the table comprising a look-up table.

5. The apparatus of claim 1, comprising a return look-up table comprising valid target addresses for return instructions and coupled to the comparison component, the comparison component to determine whether the branch instruction is a call instruction, and the translation component to derive and store another valid target address for a return instruction in the return look-up table in response to a determination that the branch instruction is a call instruction.

6. The apparatus of claim 5, the comparison component to determine whether there is a matching valid target address for a target address of a return instruction associated with a translated portion of another routine in the return look-up table.

7. The apparatus of claim 1, comprising an interface communicatively coupled to the processor component to receive the valid target address from a computing device via a network.

8. The apparatus of claim 1, the stub instruction to indicate a type of branch instruction the stub instruction is associated with.

9. The apparatus of claim 1, the comparison component to perform one or more of trigger termination of execution of the translated portion of the routine, stop translation of a portion of the routine, and remove the translated portion of the routine from a translation cache.

10. An apparatus comprising:
a translated portion of a library for execution by a processor component, the library to include a return instruction and the translated portion of the library to include a stub associated with the return instruction;
a comparison component for execution by the processor component, the stub to direct a flow of execution of the processor component from the translated portion to the comparison component, and, in response to direction of the flow of execution to the comparison component, the comparison component to determine whether there is a matching valid target address for a target address of the return instruction associated with the stub of the translated portion of the library in a return look-up table comprising valid target addresses derived from a call instruction associated with a translated portion of a routine; and
a security routine for execution by the processor component, the comparison component to direct the flow of execution of the processor component to the security routine in response to a failure to identify a matching valid target address for the target address of the branch instruction, and the security routine to determine whether to return the flow of execution of the processor component to the translated portion based on a whitelist and the target address of the branch instruction, the whitelist comprising a plurality of valid target addresses associated with valid entry points to a library, and wherein when the whitelist fails to include a valid target address that matches the target address of the branch instruction the security routine to identify an indication of a return oriented programming (ROP) attack and when the whitelist includes a valid target address that matches the target address of the branch instruction the security routine returns the flow of execution of the processor component to the translated portion.

11. The apparatus of claim 10, comprising:
a translation cache;
a table comprising valid target addresses; and
a translation component for execution by the processor component and communicatively coupled to the translation cache and the return look-up table, the translation component to translate a portion of the routine into the translated portion of the routine and place the translated portion in the translation cache, and to derive a valid target address of the call instruction and store indications of the target address of the call instruction in the table.

12. The apparatus of claim 11, the translation component to substitute one of a stub instruction and a direct conditional branch instruction for the call instruction in the translated portion of the routine to prevent immediate execution of the call instruction and trigger determination of whether there is a matching valid target address in the table for the target address of the call instruction indicated in the translated portion of the routine.

13. The apparatus of claim 11, the translation component to retrieve and translate a portion of the library with the return instruction into the translated portion of the library, and place the translated portion of the library in the translation cache.

14. The apparatus of claim 10, comprising a behavior component for execution by the processor component to determine whether a frequency of execution of return instructions exceeds a specified threshold.

15. The apparatus of claim 14, comprising:
an initialization component for execution by the processor component to retrieve an indication of the specified threshold from a policy data; and
an interface communicatively coupled to the processor component to receive the policy data from a computing device.

16. A computing-implemented method comprising:
translating, by a processor component, a portion of a routine comprising a branch instruction into a translated portion based on an address at which the routine is stored in a storage of a computing device, the translated portion including one of a plurality of types of stub instructions based on a type of the branch instruction;
determining whether there is a matching valid target address for a target address of the branch instruction in a table comprising valid target addresses in response to execution, by the processor component, of a stub instruction in the translated portion; and
determining whether to execute, with the processor component, a part of the translated portion based on a whitelist and the target address of the branch instruction in response to a failure to identify a matching valid target address for the target address of the branch instruction in the table, the whitelist comprising a plurality of valid target addresses associated with valid entry points to a library, and wherein when the whitelist fails to include a valid target address that matches the target address of the branch instruction an indication of a return oriented programming (ROP) attack is identified and when the whitelist includes a valid target address that matches the target address of the branch instruction the security routine returns the flow of execution of the processor component to the translated portion.

17. The computer-implemented method of claim 16, comprising:
placing the translated portion in a translation cache to enable execution of the translated portion by a processor component;
deriving the valid target address of the branch instruction; and
storing an indication of the valid target address in the table, the table comprising a look-up table.

18. The computer-implemented method of claim 16, comprising:
determining whether the branch instruction is a call instruction; and
deriving another valid target address for the return instruction and storing the other valid target address in a return look-up table comprising valid target addresses for return instructions in response to a determination that the branch instruction is a call instruction.

19. The computer-implemented method of claim 18, comprising determining whether there is a matching valid target address for a target address of a return instruction associated with a translated portion of another routine in the return look-up table.

20. The computer-implemented method of claim 16, comprising:
determining whether a frequency of execution of return instructions exceeds a specified threshold; and
receiving the threshold from a computing device via a network.

21. At least one non-transitory machine-readable storage medium comprising instructions that when executed by a computing device, cause the computing device to:
translate a portion of a routine comprising a branch instruction into a translated portion based on an address at which the routine is stored in a storage of a computing device, the translated portion to include one of a plurality of types of stub instructions based on a type of the branch instruction;
determine whether there is a matching valid target address for a target address of the branch instruction in a table comprising valid target addresses in response to execution, by a processor component, of a stub instruction in the translated portion; and
determine whether to execute, with the processor component, a part of the translated portion based on a whitelist and the target address of the branch instruction in response to a failure to identify a matching valid target address for the target address of the branch instruction in the table, the whitelist comprising a plurality of valid target addresses associated with valid entry points to a library, and wherein when the whitelist fails to include a valid target address that matches the target address of the branch instruction an indication of a return oriented programming (ROP) attack is identified and when the whitelist includes a valid target address that matches the target address of the branch instruction the security routine returns the flow of execution of the processor component to the translated portion.

22. The at least one non-transitory machine-readable storage medium of claim 21, the computing device caused to execute the branch instruction in response to determining that there is a matching valid target address in the table.

23. The at least one non-transitory machine-readable storage medium of claim 21, the computing device caused to:
place the translated portion in a translation cache to enable execution of the translated portion by a processor component;
derive the target address of the branch instruction; and
store an indication of the target address in the table, the table comprising a look-up table.

24. The at least one non-transitory machine-readable storage medium of claim 23, the computing device caused to substitute one of a stub instruction and a direct conditional branch instruction for the branch instruction in the translated portion to prevent immediate execution of the branch instruction and trigger determination of whether there is a matching valid target address in the table.

25. The at least one non-transitory machine-readable storage medium of claim 21, the computing device caused to:
determine whether the branch instruction is a call instruction; and
derive another valid target address for the return instruction and store the other valid target address in a return look-up table comprising valid target addresses for return instructions in response to a determination that the branch instruction is a call instruction.

26. The at least one non-transitory machine-readable storage medium of claim 25, the computing device caused to determine whether there is a matching valid target address for a target address of a return instruction associated with a translated portion of another routine in the return look-up table.

27. The at least one non-transitory machine-readable storage medium of claim 21 the computing device caused to:
determine whether a frequency of execution of return instructions exceeds a specified threshold; and
receive the threshold from a computing device via a network.

* * * * *